US005666255A

United States Patent [19]
Muelleman

[11] Patent Number: 5,666,255
[45] Date of Patent: Sep. 9, 1997

[54] TRANSFORMERLESS CONDITIONING OF A POWER DISTRIBUTION SYSTEM

[75] Inventor: Norman F. Muelleman, Cary, Ill.

[73] Assignee: Powervar, Inc., Lake Forest, Ill.

[21] Appl. No.: 461,499

[22] Filed: Jun. 5, 1995

[51] Int. Cl.$^6$ .................................... H02H 3/22
[52] U.S. Cl. .................. 361/111; 361/43; 361/45; 361/113; 361/118; 361/58; 363/39
[58] Field of Search ..................... 361/56, 58, 111, 361/113, 117, 118, 91, 45, 46, 42, 43, 49–50; 333/181; 363/39, 46

[56] References Cited

U.S. PATENT DOCUMENTS

| Re. 31,704 | 10/1984 | Hester | 361/399 |
|---|---|---|---|
| 783,533 | 2/1905 | Moody. | |
| 1,530,648 | 3/1925 | Casper. | |
| 1,530,649 | 3/1925 | Casper. | |
| 2,725,502 | 11/1955 | Chiles, Jr. et al. | |
| 3,614,534 | 10/1971 | Gross | 317/18 D |
| 4,180,841 | 12/1979 | Engel | 361/45 |
| 4,573,098 | 2/1986 | Williston | 361/42 |
| 4,598,331 | 7/1986 | Legatti | 361/46 |
| 4,710,861 | 12/1987 | Kanner | 363/46 |
| 4,882,646 | 11/1989 | Genuit | 361/42 |
| 5,174,293 | 12/1992 | Hagiwara | 128/653.1 |
| 5,177,657 | 1/1993 | Baer et al. | 361/45 |
| 5,313,358 | 5/1994 | Severinsky | 361/118 |
| 5,327,319 | 7/1994 | Lee et al. | 361/118 |
| 5,388,021 | 2/1995 | Stahl | 361/56 |
| 5,448,443 | 9/1995 | Muelleman | 361/111 |

OTHER PUBLICATIONS

UL 1283 Jun. 30, 1993 *Standard For Electromagnetic Interference Filters* pp. 20–21.
Exide Electronics, 1992, Brochure, Powerware Plus.
Powervar, Mar. 1992, SM–148, Smart Uninterruptible Power Systems, Models ACE605S/ACE800S/ACE1400S.
Powervar, Apr. 3, 1989, Brochure, The Chip Protectors, Powervar ACE400.
Powervar, Mar. 1992, Brochure, SM–147A, Power Conditioned UPS, Models ABCE600/ABCE800.
Powervar, Apr. 1991, Brochure, SM–110, Medical Power Conditions 78VA to 2400VA, 120VAC, 60Hz, UL544.
Powervar, Mar. 1992, Brochure, SM–149, Industrial Power Conditioners, 360VA to 1500 VA, 120VAC Output, 60Hz.
Powervar, Mar. 1992, Brochure, SM–118A, Powervar MedAC, Medical Power Conditioned UPS 600/800VA, 120VAC Output, 60Hz, UL544.
Powervar, Nov. 11, 1989, Brochure, The Chip Protectors, Power Probe PP15.
Powervar, Mar. 1992, Brochure, SM 120A, The Electronic System Power Specialists, Hybrid Power Conditioner 78VA to 2400VA.

(List continued on next page.)

*Primary Examiner*—Jeffrey A. Gaffin
*Assistant Examiner*—Michael J. Sherry
*Attorney, Agent, or Firm*—Lee, Mann, Smith, McWilliams, Sweeney & Ohlson

[57] ABSTRACT

A transformerless conditioner of a power distribution system consists of an electronically enhanced filter (EEF) for suppression of transient impulses on the power line and neutral line, and a transformerless ground conditioner for suppression of transient impulses on the ground line. The filter includes a normal mode filter having an inductor located on the power line and an inductor located on the neutral line between source and load of the power distribution system, and a pair of capacitors arranged in series and connected between the power and neutral lines, whereby a midpoint tap is formed between the pair of capacitors. The EEF also includes a unique common mode filter which is formed by the series connection of either inductor of the power line or the neutral line, or both, to its corresponding capacitor and then to the midpoint, from which an electronic impulse detector is connected to ground. The impulse detector is set to actuate an electronic switch, also connected to midpoint, and thereby connect a large capacitor from ground to the midpoint during the presence of a transient impulse on either the power line, neutral line or both. Optionally, a transformerless ground conditioner can be included to block or attenuate transient impulses on the ground line.

23 Claims, 9 Drawing Sheets

OTHER PUBLICATIONS

Powervar, Undated, Brochure, The Electronic System Power Specialists, Power Conditioners 1-Phase 2-6KVA Description: A, B, C.

Powervar, Undated, Brochure, The Electronic System Power Specialists, Power Conditioners 3-Phase 5-125KVA, Description: A, B, C.

Powervar, Apr. 1992, Brochure, SM-146, Uninterruptible Power Systems Models ACE300/ACE450.

Powervar, Apr. 1991, Brochure, SM-101, ACE650™, ACE1200™, Uninterruptible Power Systems.

NECA, 1982, Booklet, Electrical Design Library, Computer Power Conditioning.

Power Unity Electronics, Inc., Undated, Brochure, Voltage Surges & Transients, Cause Electronic Equipment Failure.

Unity Power Systems, Undated, Brochure, Transient Protectors.

Unity Power Systems (Canada) Ltd., Nov. 10, 1983, Brochure, Is Your Computer Sick?

The Work Boat, Jan., 1980, Unity Power Systems Northeast, Wallace J. Izzo, Voltage Spike Suppression Vital For Radios, Motors.

Power Unity Electronics, Inc., Undated, Brochure, Service-Line, Control of Spikes and Transients by Howard Cooper.

A. T. Saunders, Manager, Signode Corp., Undated Paper, Protection of Electronic Systems from the Effects of Voltage Transients.

Irwin Lazar, Jun., 1980, Article, Suppressing Overvoltage Transients.

Commline, Jan./Feb., 1981, Article, Predictive Maintenance by Improving The NC Controllers Environment by Howard Cooper.

Commline, Nov./Dec., 1980, Article, Reducing NC Downtime by Howard Cooper.

Reliance Electric Limited, Undated, Article, Maintenance Problems with Thyristor Drives for The Hamilton Electrical Maintenance Club by John Beckett, Reliance Electric Limited.

Article, Feb. 12, 1981, Getting Power to the Pump, Charles Van Koningsveld, Louis Allis Co., Milwaukee, Wisconsin.

Unity Power Systems (Canada) Ltd., Nov. 1, 1983, Article, Having Problems With Your Lighting Systems? K. A. (Ken) Leach.

TRANSFORMERLESS CONDITIONING OF A POWER DISTRIBUTION SYSTEM

BACKGROUND OF THE INVENTION

1. Field of the Invention

The present invention relates to suppressing transient impulses in a power distribution system and more particularly to a device and method for suppressing transient impulses without using an isolation transformer.

2. Description of the Prior Art

Conventional conditioning circuits have been developed to filter and suppress transient impulse conditions from propagating in a power distribution system, for example, electrical noise, severe overvoltage, transient, voltage impulse, current impulse, and the like. The power distribution system can be configured as either a two wire, single phase power distribution system having a power line or a neutral line or as a three wire system having a power line (L), neutral line (N) and a ground line (G). A transient voltage impulse on either the power line or neutral line with respect to the ground line is commonly known as common mode (cm) noise. A transient voltage impulse on the power line with respect to the neutral line is referred to as normal mode (nm) noise. Transient voltage impulses are predominately found on the power line yet can be found on the neutral line, for example, when these are miswired by switching the power and neutral lines. Power conditioning filter circuits operate, for example, to convert a transient voltage to a transient current, and then to inject, shunt or otherwise dump the transient current to the ground line, whereby these currents propagate thereon until reaching absolute ground.

It is important to suppress the transient impulse condition because it can have destructive effects and create problems in electrical equipment such as errors, failures and other abnormalities. Transient voltage and other surge voltage data has been compiled by the IEEE 587 Surge Voltage Working Group and published as ANSI standard C62.41. The worse case surge voltages have been attributed to lightning strikes on the power line. The worse case surge voltage was noted to have a practical limit of ±6000 volts or ±6 kilovolts (kv). This limit is governed by the intrinsic capability of electrical wiring systems and devices to withstand this level of surge voltage. The surges were further characterized by their rise time and decay time which is dependent on their position of incidence along the power network. If the incidence occurs on the primary side of a distribution transformer then the incident appears as a one half microsecond (½μsec) rise time impulse with a 100 kilohertz (KHz) damped ring wave decay to zero. If the incident is on the secondary side of a distribution transformer then the impulse is unipolar and has been characterized with a 1.0 μsec rise time and 50 μsec decay time to one half (½) its peak value. These wave shapes are determined by the incident surge voltage interacting with the impedance of the distribution transformer.

Conventional power conditioning can be classified three ways: (1) simple filters; (2) Transient Voltage Suppressors (TVSS); and (3) isolation transformer based filters and TVSS. Simple filters and TVSS shunt transients to ground. Isolation transformers block transients from the load and ground. The isolation transformer typically is located between the power and neutral lines on the load side and the corresponding power and neutral lines of the line side of the circuit so as to operate as a filter. While placing filters on the power and the neutral lines can suppress transient voltages on these with respect to the ground line, this does nothing to suppress a transient current injected or induced on the ground line from propagating in the ground line of the power distribution system.

A transient current propagating in the ground line can create problems in electrical equipment connected to the power distribution system, even with power conditioning, such as errors, failures and other system abnormalities. In most systems, the ground line has been left unconditioned because of concerns for reliable protection against electrical fault conditions in the electrical equipment drawing power therefrom. I have previously devised a method and system of power conditioning that includes a transformer to aid in suppressing transient currents in the ground line as well as transient voltages on the power and neutral lines, as set forth in my patent application Ser. No. 07/921,337, which is incorporated herein by reference. However, there are many disadvantages of filter circuits configured with transformers such as their bulk, weight and cost.

The present invention overcomes these and other disadvantages to make a device and method of transformerless conditioning of the power distribution system which can match the performance of transformer based filters. The present invention provides a transformerless circuit for filtering common and normal mode noise. The present invention also provides a circuit for conditioning the ground line without using transformers.

SUMMARY OF THE INVENTION

It is therefore an object of the invention to provide a conditioning circuit for power distribution systems which avoids the above-described difficulties of the prior art.

It is another object of the present invention to provide a power conditioning circuit for suppressing transient voltages on the power and/or neutral lines in a power distribution system which provides sure and effective rejection of surge impulses.

It is still another object of the present invention to provide a ground conditioning circuit for suppressing transient currents in the ground line of a power distribution system which provides sure and effective rejection of surge impulses.

Another object of the present invention is to provide a system and method of transformerless ground conditioning which is of a simple design, has increased reliability and has a lower cost of manufacturing.

Yet another object of the present invention is to provide transformerless low level ground conditioning($GC_L$).

Still yet another object of the present invention is to provide transformerless high level ground conditioning ($GC_H$).

It is an object of the present invention to provide transformerless ground conditioning which utilizes an electronically enhanced filter (EEF).

It is an object of the present invention to provide transformerless power conditioning in other distribution systems including noise on a data line, telephone line, and the like.

Another object is to provide power conditioning with a reserve power backup.

In brief, the present invention provides an electrically enhanced filter and method for suppression of transient impulses in a power distribution system having a power line and neutral line. The power distribution system has a connection to ground and may have a ground line. The filter includes a normal mode filter and a common mode filter referenced to ground. The normal mode has at least one inductor located on each of the power and neutral lines between a line and a load of the power distribution system. The normal mode filter includes a pair of capacitors arranged in series and connected between the power and neutral lines thereby forming a midpoint tap. The common mode filter has an impulse capacitor connected at one end to the midpoint tap and at the other end to ground. The common mode filter utilizes the inductors of the power and neutral lines. The filter also includes an electronic trigger comprised of an impulse detector and a switch. The switch is normally open and adapted to close upon detection of the transient impulse at the midpoint tap so as to attenuate the transient impulse by shunting it to ground.

BRIEF DESCRIPTION OF THE DRAWINGS

FIG. 8a illustrates a state where an impulse voltage appears on the power line; FIG. 8b illustrates a state where the impulse voltage appears on the neutral line; FIG. 8c is a graphical illustration of impulse voltages on the power and neutral lines as drawn from the midpoint tap.

DESCRIPTION OF THE PREFERRED EMBODIMENTS

Power Conditioning

Figure 1:
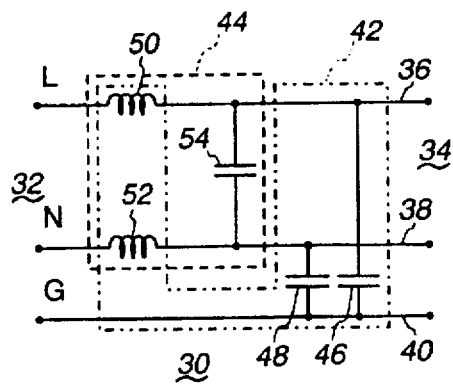
FIG. 1 is a circuit diagram illustrating a power line filter for suppressing common and normal mode noise.

Referring to the drawings in detail, and initially to FIG. 1 thereof, it will be seen that power conditioning can be implemented using a power line filter 30 between a line 32 and a load 34. Power distribution systems are conventionally configured to deliver a source of electrical power to electrical devices located in a house, building or other structure. For example, throughout the United States electrical power is delivered at 60 Hz, single phase and three phases with electrical devices typically rated at 120 VAC whereas in other countries it is delivered at 50 Hz with devices rated at 220, 230 or 240 VAC. Power conditioning can be defined as protecting only a power line 36 and/or a neutral line 38 of a three wire, single phase, power distribution system from transient impulses at the power source referenced to a ground line 40. Throughout the following detailed description, like elements will be referred to using the same numerals whenever possible.

The power line filter 30 includes a common mode filter 42 and a normal mode filter 44. Common mode noise is a transient voltage impulse on either the power line 36 or neutral line 38 with respect to the ground line 40. The common mode filter 42 filters common mode noise on either the power line 36 and/or the neutral line 38 with respect to the ground line 40 using capacitors 46 and 48 acting in concert with inductances 50 and 52, which are placed in series with the power and neutral lines 36 and 38, respectively. The inductances 50 and 52 conventionally convert a transient voltage to a transient current. The capacitors 46 and 48 shunt the transient current to ground line 40 from the power line 36 and the neutral line 38. The capacitors 46 and 48 can have a relatively low capacitive reactance above some relative frequency. For example, either of the capacitors 46 and 48 can be configured to have a maximum value of 0.010 microFarad (μF) because, if a fault condition of an open ground occurs, these components should not conduct a power current above 500 microAmperes (μA) into a floating ground reference whether lines 36 and 38 are wired correctly or miswired and reversed. The reason is that if a person contacts the floating ground reference while simultaneously being earth referenced at other parts of their body, then a current can flow through their body to the earth reference. Therefore, 500 μA has been determined to be the safe maximum body current.

Similarly, normal mode noise is a transient voltage impulse on the power line with respect to the neutral line 38. The filter 44 filters normal mode noise using a capacitor 54 which can have a relatively low capacitance reactance above some relative frequency acting in concert with the inductances 50 and 52. The capacitor 54 shunts the transient current between the neutral line 38 to the power line 36. The capacitor 54 can be of any value and construction within the desired impedance of the capacitor at power line frequencies. The capacitor 54 can have a large value or a low capacitive reactance to 60 Hz currents so as not to overheat the wiring of the power distribution system, for example, 10–20 μF, whereby 20 μF will be a reactance of 120 Ω at 60 Hz which will allow 1 Ampere of capacitive reactance current to flow. Also, as a practical matter, the capacitor 54 should not trip any overcurrent protectors for the wiring, for example, fuses, circuit breakers and the like.

The inductances 50 and 52 can have various constructions and these can be made from conventional inductors and selected for a desired voltage drop, temperature rating at full load current, electrical filtering, and physical parameters such as cost, size and weight. The inductors 50 and 52 should not saturate at the line current rating of the power distribution system. Additionally, the inductors 50 and 52 should have a high bandwidth, for example, operating at a frequency in the range of DC to 5–10 MHz or higher. Conventional power line filters require redundant components and extra circuitry to safeguard against the miswiring fault condition. However, the present invention reduces this redundancy to advantageously provide a power line filter that utilizes circuitry to overcome the disadvantages of conventional power line filters, as is discussed further herein.

Transformerless Electrical Power Line Filter

As set forth herein, the transformerless power line filters 30, 60, 74, 92, 100, and 150, provide electrical filtering of noise on the power and neutral lines, i.e. both common and normal mode noise, with respect to ground and with respect to each other. One of the problems that can occur in conventional filtering is in the attachment or reference of the filter to the ground line for common mode noise filtering. The ground line has to safely conduct fault conditions, as well as surge impulses back to absolute ground while providing electrical reference both inside and outside an electronic system. Capacitors used for common mode filtering generate a leakage current to the ground line 40, whereby the maximum allowable leakage current is 500 microAmperes. Limitations on the leakage current dictate the maximum value of capacitance from a power line 36 or the neutral line 38 to ground such as a maximum value of 0.010 µF. As a result, conventional power conditioners and filters have disadvantages and may be ineffective for ±6 KV ring and unipolar transient voltages because of the safety restriction on common mode filter capacitors. The present invention overcomes these disadvantages to provide an improved transformerless power line filter.

Figure 2:
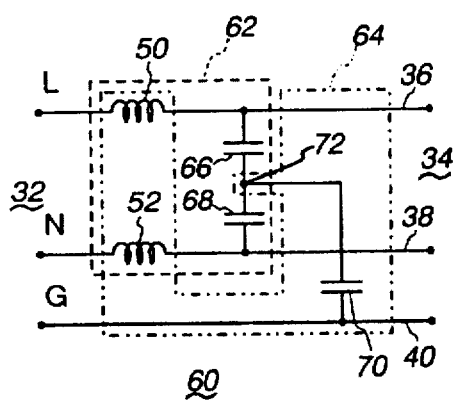
FIG. 2 is a circuit diagram illustrating a power line filter configuration for an electrically enhanced filter according to the present invention.

Referring to FIG. 2, a filter 60 doubles the common mode performance benefit of the circuit of FIG. 1. The filter 60 includes a normal mode filter 62 and a common mode filter 64. The normal mode filter 62 includes the inductors 50 and 52, and a pair of capacitors 66 and 68 arranged in series and connected between the power line 36 and neutral line 38. The capacitors 66 and 68 are chosen to have equal values or an equal capacitive reactance, for example, each having a value in the range of about 3–20 µF. The capacitors 66 and 68 replace the capacitor 54 of the filter 30 shown in FIG. 1. The common mode filter 64 includes the inductors 50 and 52 and a capacitor 70 connected at one end to a mid-point tap 72 located between the capacitors 66 and 68, and to the ground line at the other end. The midpoint tap 72 cuts the power line voltage in half, for example, to 60 VAC. The tap 72 provides the advantages of simplifying and improving the common mode filter to enable simultaneous monitoring of both the power line 36 and the neutral line 38, creating a circuit that is independent of miswiring of the power and neutral lines 36 and 38, respectively, and allowing for the use of only one switching circuit as described herein. The capacitor 70 has a capacitive reactance that can be one half of the capacitive reactance of the capacitors 46 and 48. The common mode filter 64 advantageously uses the single capacitor 70 to provide immunity from the fault condition of miswiring of the power line 36 and neutral line 38, power conditioning of any polarity using the mid-point tap 72, and a simplified design using only one capacitor for the common mode filter 64 that can be electronically connected and disconnected as described herein.

Figure 3:
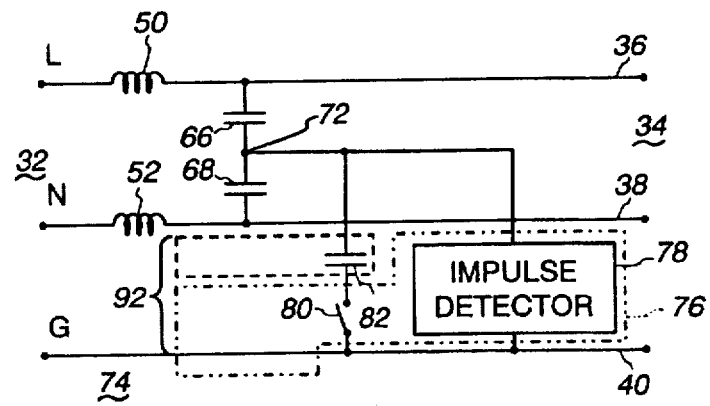
FIG. 3 is a circuit block diagram illustrating an electrically enhanced filter of the present invention which includes an impulse detection circuitry having a switch configured in the normally open position.

As illustrated in FIG. 3, an embodiment of the present invention provides an electrically enhanced filter (EEF) 74. Generally, the EEF 74 enhances the performance of the capacitor of the common mode filter using an electronic trigger 76 comprised of an impulse detector 78 and a switch 80. The impulse detector circuit 78 is adapted to operate on bipolarity impulses up to ±6 kV. The capacitor 82 can have an effective value over 100 times greater than the capacitive reactance of capacitor 70 of FIG. 2, which is regulated to a maximum value of 0.02 µF, thereby allowing the impulse or surge current (but not fault current) dumped into ground to exceed 500 µA. The capacitor 82 can have an unlimited capacitive reactance but normally will be approximately 3–20 µF. The electronic trigger 76 has the switch 80 normally open, and closes the switch 80 when the impulse detector circuit 78 senses a voltage impulse at the midpoint tap 72 which exceeds a predetermined threshold voltage ($V_{TH}$). The switch 80 preferably is a bi-directional conducting semiconductor switch configured so as to be able to conduct bipolar noise, transient voltage and current impulses and the like on any line, with any polarity or at any phase angle of the power voltage.

The switch 80 can be conventionally configured as either a hard switch such as a relay, transistor, TRIAC, SCR or the like, or as a semiconductor soft switch either of which closes at a predetermined voltage threshold, $V_{TH}$. The soft switch allows just enough conduction current to effectively divert the incident impulse without disturbing the power waveform. The semiconductor switch 80 can be a bi-polar junction transistor (BJT), a power MOSFET, or an insulated gate bi-polar transistor (IGBT). The impulse detector circuit 78 is configured to trip and close the switch 80 at a predetermined voltage determined to be the threshold voltage, $V_{TH}$, required to turn on or actuate the switch 80, whether a BJT, MOSFET or IGBT. The threshold voltage for BJT is less than 1 volt, for example, 0.6 to 0.8 volts. The threshold voltage for the power MOSFET or IGBT is approximately 4 to 5 volts. A small trigger current must be supplied from the mid-point tap 72 so as to divert the incident impulse current, which may be on the order of 100 times or more the value of the trigger current.

Figure 4:
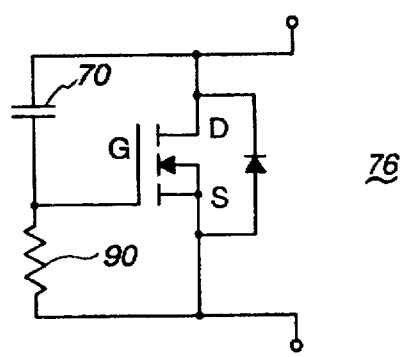
FIG. 4 is a circuit diagram illustrating an n-channel power MOSFET configuration of a reverse operated Miller Integrator as utilized by the present invention.

Referring to FIG. 4, the switch 80 can be a soft switch configured as a reverse operated Miller Integrator, 76, which utilizes negative feedback. The switch 80 is an n-channel power MOSFET selected to have a power handling capability of 20–30 A at up to 160–180 volts peak for a duration of 5–10 µsec. The reverse operated Miller Integrator behaves as a voltage differentiator for positive voltages between the drain, D, and the source, S, referred to as $V_{DS}$. The n-channel power MOSFET and its intrinsic diode allows both polarities of current conduction and has the advantages of good bandwidth performance as well as peak power handling capability. In operation, the capacitor 70, C, charges up to $V_{DS}$ through the gate (G) to source resistor, R. If $V_{DS}$ is a time variant voltage, $V_{DS}(t)$, much larger than the turn on voltage of the transistor, or its threshold voltage, $V_{TH}$, and the circuit is designed so that the transistor remains off, then the voltage across C follows $V_{DS}$ (t) and the time displacement current through C, Ic(t), is the product of the capacitance, C, and the time differentiation of $V_{DS}$ (t) or:

$$Ic(t)=C \cdot d\, V_{DS}(t)/dt. \tag{1}$$

The condition where the transistor remains turned off is met if the most positive value of the gate to source voltage, $V_{GS}$, is less than $V_{TH}$. Now, $V_{GS}$ (t) is equal to the product of Ic(t) and R by the relation, $$V_{GS}(t)=I_C(t)\cdot R \qquad (2)$$

Therefore, for the transistor to remain turned off, the most positive value of the product of the time differential of $V_{DS}$(t) and R·C must be less than $V_{TH}$. When the transistor is turned off, the impedance of the circuit between the drain and source terminal is the series RC network, and the filtering characteristics of the circuit are that of the series RC network in conjunction with the circuit's external impedance. When the transistor of FIG. 4 turns on, the impedance between the drain and source terminals becomes lower than the RC network. If the circuit of FIG. 4 is used with an external impedance, much larger than the on state impedance, then the filtering characteristics of the RC network are enhanced by the transistor's conduction. The circuit becomes an electronic enhanced filter (EEF) as shown herein.

Figure 5:
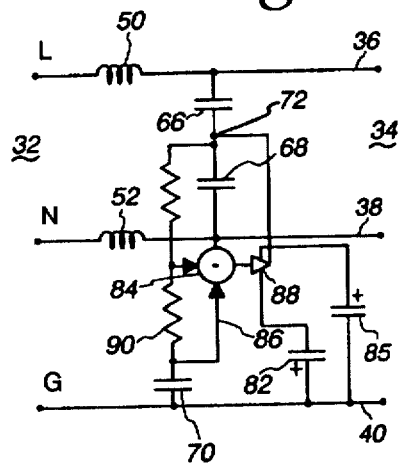
FIG. 5 is a circuit diagram illustrating a comparator circuit for regulating the voltage drawn from the midpoint tap as used by a bi-polar electrically enhanced filter according to an embodiment of the present invention.

As shown in FIG. 5, the EEF operates as a comparator 84 connected to the midpoint tap 72 for comparing the voltage at the tap 72 to a reference signal or power line voltage 86 to generate an error signal. The comparator 84 outputs and supplies the error signal to an amplifier 88 which operatively supplies a negative feedback signal to the midpoint tap 72. The negative feedback signal output from the amplifier functions to either source or sink transient currents equal in magnitude but opposite polarity to the transient currents getting through the inductors 50 and 52. In addition, the negative feedback signal functions to hold the midpoint tap 72 at an equivalent AC ground, whereby the voltage present at the midpoint is electronically the same as ground over the operating frequency of the EEF. In this manner, the power line voltage is ignored by the EEF 74 circuit because it is too slow as the EEF 74 is configured to attenuate fast transient voltages. As above, the goal of the EEF 74 is to reduce the worst case ±6000 volts common mode and normal mode impulse on any line, polarity or power phase to ±10 volts or less, for example, the damped the ring wave defined by IEEE. This selective looking is accomplished by choosing the proper configuration for the RC network of the resistor 90 and capacitor 70. As the comparator 84 operates to smooth out or average high frequency voltage, at the tap 72 with respect to the power line frequency, it is represented as a subtractor but also can be an adder. Simply, the comparator 84 provides a fast comparison with the reference signal 86, takes the difference finding the error signal, amplifies and inverts the error signal at 88, and adds this equivalent but opposite signal to the power line current.

Figure 6:
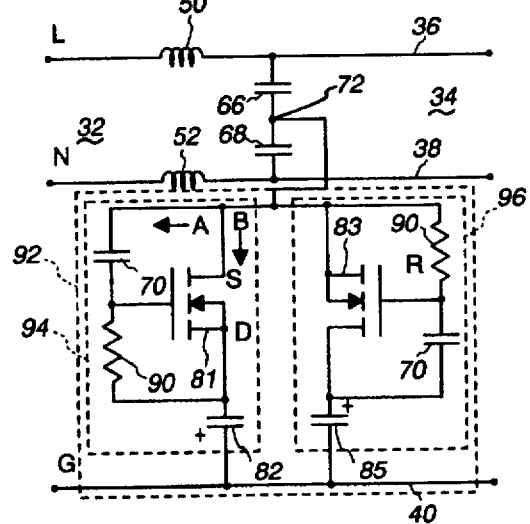
FIG. 6 is a circuit diagram illustrating a bi-polar electrically enhanced filter according to an embodiment of the present invention.

As illustrated in FIG. 6, a bi-directional electrically enhanced filter 92 includes the positive impulse polarity branch circuit 94 and negative impulse polarity branch circuit 96, respectively. The positive impulse branch circuit 94 includes an n-channel power MOSFET switch 81, a resistor 90 and capacitor 70 for biasing the gate, and energy reservoir capacitor 82. The power MOSFET switch 81 has its drain receiving transient currents from the midpoint tap 72 and dumping these currents to the ground line 40 via its drain and cap 82. The capacitor 70 and resistor 90 are selected to look for fast transient voltage impulses and to have normal power line voltage across the resistor be less than the turn on voltage of the switch 81, or just below its gate threshold voltage. For example, 81 is selected to be normally open and to close when ±3–5 volt impulses or higher are detected at the tap 72. In operation, a positive voltage impulse allows a small percentage of the current to follow path A to bias and turn on the gate, thereby allowing a majority of the transient to flow through the switch 81 to the ground line 40 via capacitor 82. In this manner, branch circuit 94 sources positive charges to ground. Similarly, the negative impulse branch circuit 96 can be configured using an n-channel power MOSFET switch 83 to sink a negative transient impulse current to the ground line 40 via energy reservoir capacitor 85. In order to sink negative transient impulses, the switch 81 and its biasing components resistor 90 and capacitor 70 are inverted and the drain is connected to another energy reservoir capacitor 85. The inverted switch 81 is referred to as 83. In operation, a negative impulse occurring at the midpoint tap 72 biases the source to turn on, thereby allowing charges stored on the capacitor 85 to flow through the switch 83 and fill in the negative voltage impulse at tap 72.

Each branch circuit 94 and 96 includes energy reservoir capacitors 82 and 85, respectively, operating in conjunction with the inductors 50 and 52 to provide common mode filtering, and the capacitors 66 and 68 operate in conjunction with the inductors 50 and 52 to provide normal mode filtering.

Figure 7:
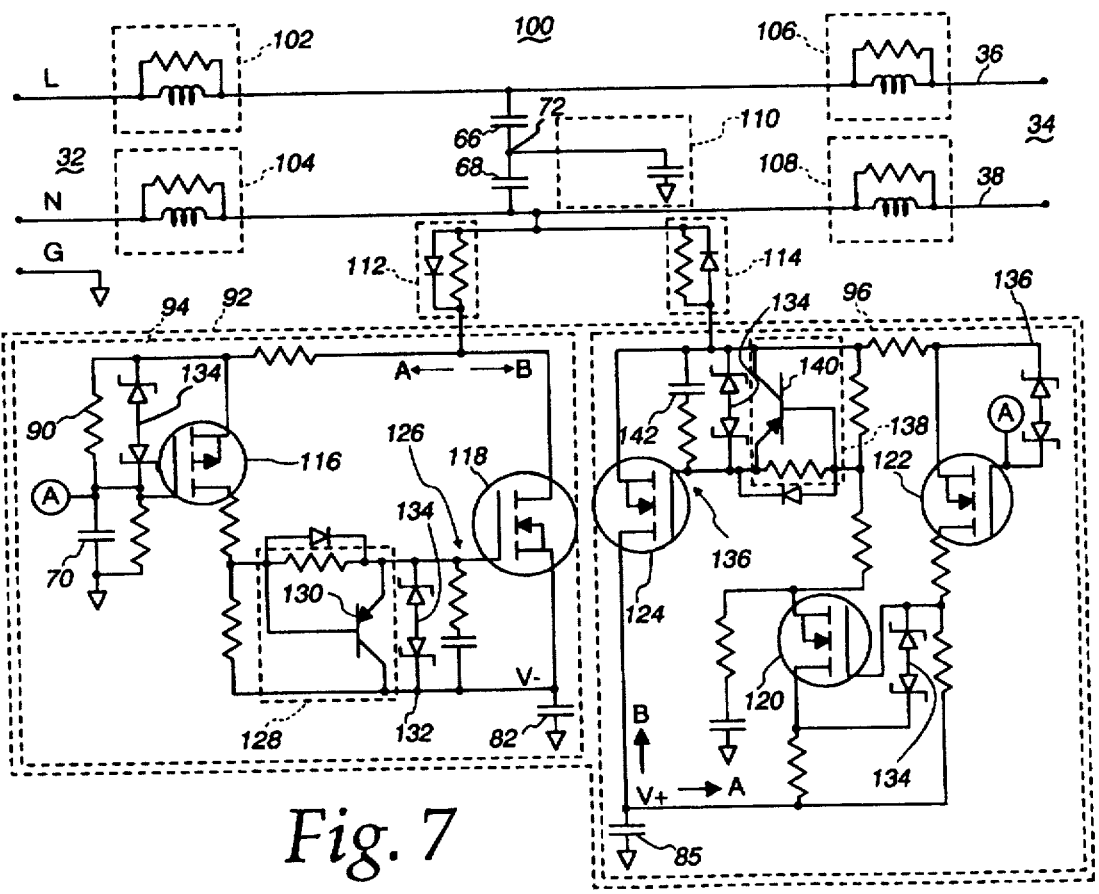
FIG. 7 is a circuit diagram illustrating a 4-quadrant, bi-polar, electrically enhanced filter according to the present invention.

As illustrated in FIG. 7, another embodiment of a hi-directional electrically enhanced filter is shown generally as power conditioner 100. The power conditioner 100 includes the EEF 92, impedances 102, 104, 106 and 108, and the RC frequency stabilization section 110. The impedances 102, 104, 106 and 108 are connected to the midpoint tap 72 via a capacitor 66 or 68, as required by the filtering. The impedance 102 is inserted on the power line 36 connected between the line 32 and the midpoint tap 72. The impedance 104 is inserted on the neutral line 38 and connected between the line 32 and the midpoint tap 72. The impedance 106 is inserted on the power line 36 between the load 34 and the midpoint tap 72. The impedance 108 is inserted on the neutral line 38 and connected between the load 34 and the midpoint tap 72. The impedances 102, 104, 106 and 108 can be constructed from an inductor connected in parallel with a resistor, whereby the impedances 102 and 104 attenuate transients from the line 32 and the impedances 106 and 108 attenuate transients from the load 34. The inductances 102, 104, 106 and 108 can be constructed from conventional components, for example, impedances 102 and 104 can be constructed from a 2000 Ω resistor connected in parallel with a 400μHenry inductor, and impedances 106 and 108 can be constructed from a 1 kΩ resistor in parallel with a 200μHenry inductor. The RC frequency stabilization section 110 can be constructed from a 12 Ω resistor in series with a 0.001 μF capacitor connected to the ground line 40.

The EEF 92 includes positive and negative branch circuits 94 and 96, respectively. Branch circuits 94 and 96 can include isolation sections 112 and 114, which aid in overall circuit stabilization and for separating or otherwise isolating branch section 94 from branch section 96 when the impulses are transitioning polarity. Branch circuit 94 includes MOSFET switch 116 and power MOSFET 118, which operate together in a feedback mode to source a positive transient impulse to the ground line 40 via capacitor 82. Similarly, the branch circuit 96 includes MOSFET switches 120, 122 and power MOSFET 124, which also operate together in a feedback mode to sink a negative transient impulse to the ground line via the capacitor 85.

In operation, the power conditioner 100 can attenuate positive and negative impulses. When a positive impulse is present at the midpoint tap 72, the impulse is sinked to the branch circuit 94 by isolation section 112. A small amount of the impulse current is supplied to the p-channel MOSFET 116 via branch A. The MOSFET 116 switch turns on and supplies current to gate network 126 to close or otherwise turn on the n-channel power MOSFET switch 118, allowing the impulse to travel via branch B through the power MOSFET 118 and capacitor 82 to the ground line 40, thereby attenuating the pulse. The recovery circuit 128 operates to open the power MOSFET switch 118 once the impulse has been attenuated, restoring the switch 118 to the normally open position ready for the next impulse. A transistor 130, shown as a pnp BJT, is used to discharge the gate-source capacitance of 118 quickly, thereby opening the power MOSFET switch 118. Zener diode bridges 134 are used to protect the gate-source junctions of the switch is 116 and 118.

When a negative impulse is present at the midpoint tap 72, the impulse current is sourced by the branch circuit 96 by isolation section 114. The capacitor 85 discharges with current following branch A to the p-channel MOSFET switch 120, which is configured to invert the logic of the n-channel MOSFET switch 122. The switch 122 functions to turn on and supply current to gate network 136 to close or otherwise turn on the n-channel power MOSFET switch 124, via inverter 120, allowing the capacitor 85 to source current via branch B through the power MOSFET 124 to attenuate the negative impulse at the midpoint tap 72. The recovery circuit 138 operates to open the power MOSFET switch 124 once the impulse has been attenuated, restoring the switch 124 to the normally open position ready for the next impulse. A transistor 140, shown as a pnp BJT, is used to discharge the gate-source capacitance of power MOSFET 124 quickly, thereby opening the power MOSFET switch 124. Again, zener diode bridges 134 are used to protect the gate and the source of the switches 120, 122 and 124.

The capacitor 82 of the branch circuit 94 charges up to the peak negative voltage of the midpoint tap 72, through the intrinsic diode of transistor 118. Likewise, the capacitor 85 of the branch circuit 96 charges up to the peak positive voltage of midpoint tap 72 through the intrinsic diode of the transistor 124. Once charged to the peak positive or negative voltage, the capacitors 82 and 85 do not conduct any current to the ground line 40 until a transient surge or impulse is present at the midpoint tap 72. Thus, capacitors 82 and 85 do not contribute to ground leakage current when the power line 36 and neutral line 30 have impulse voltages less than the threshold voltage of the EEF.

Finally, the inverse back-back Miller Integrator scheme advantageously utilizes the intrinsic diode of the secondary or opposite Miller Integrator to attenuate incident transient surges and impulses too energetic to be handled by the primary, initial Miller Integrator. The complementary configuration increases the capacity of the EEF to absorb the incident impulse.

The soft switch conducts enough current hold the voltage on its drain terminal constant with respect to its source terminal. The conduction of switches is regulated in part by the inductors 50 and/or 52 to achieve a relatively constant voltage at the drain terminal. Another component of the conduction of the switches is the degree of transconductance of the transistors and the feedback from the drain to the gate. The complementary feedback transistor switch configuration is advantageous in providing quicker recovery times for filtering the next impulse, attenuation of higher transient voltages and surges, improved sensitivity, and a lower threshold voltage to turn on the soft switch.

Figure 8A:
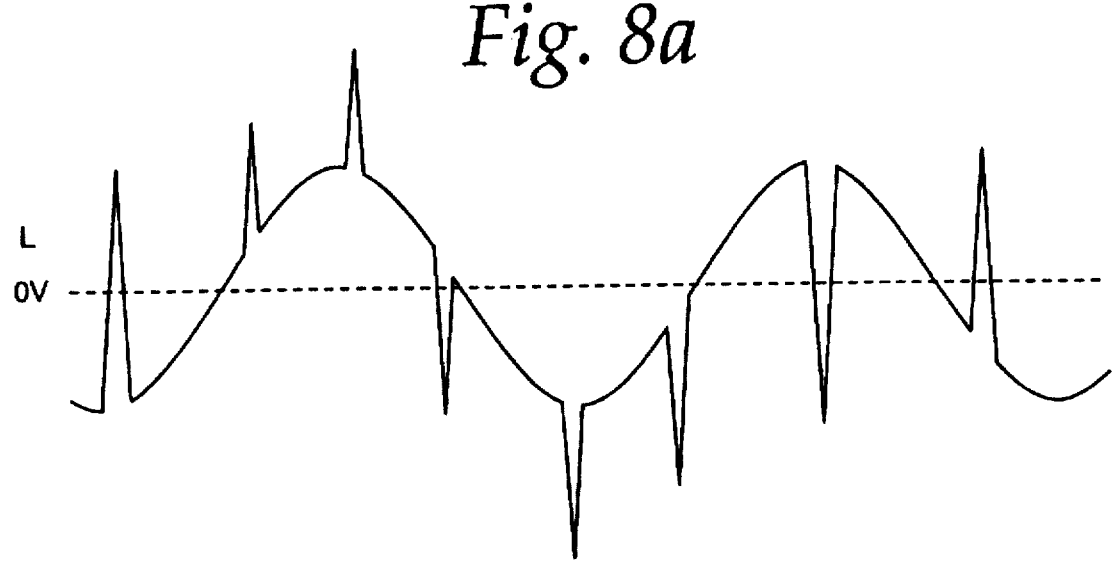
FIGS. 8a, 8b and 8c are graphical illustrations of common mode noise where
Figure 8B:
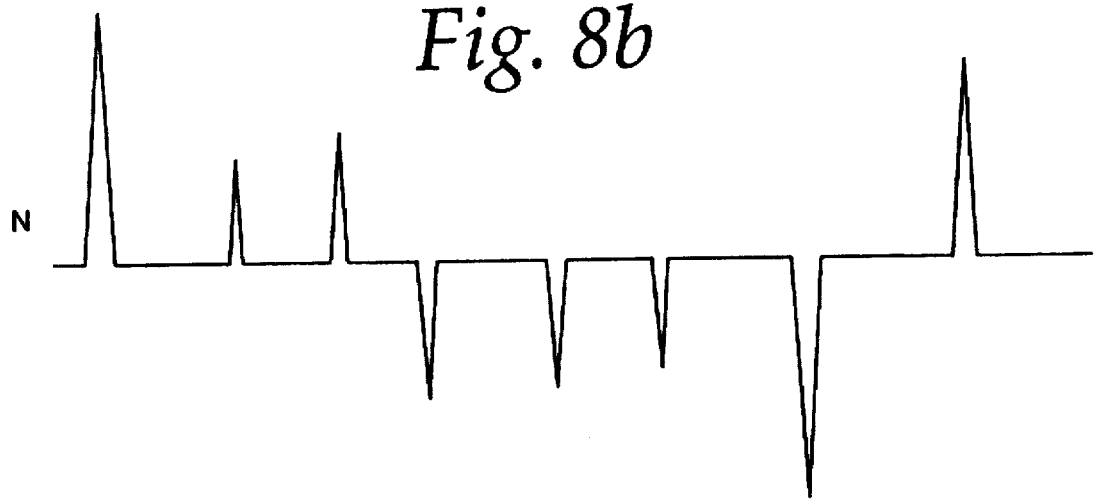
Figure 8C:
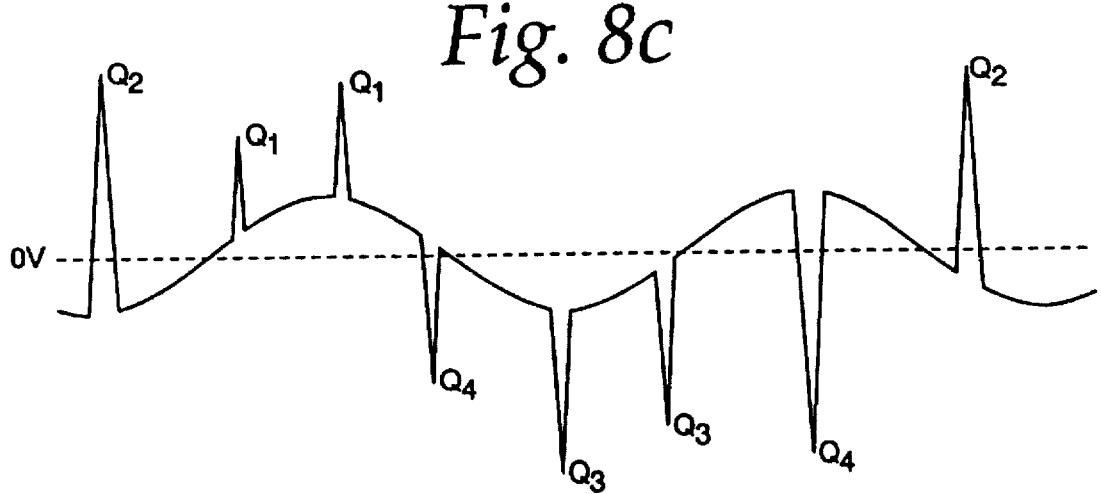

As illustrated in FIGS. 8a, 8b, and 8c is a diagram of the impulse voltages on the power line, neutral line and the combined value as taken from the midpoint tap 72. FIG. 8a graphically illustrates the voltage present on the power line 36 with transient voltage impulses, illustrated as spikes, that may be present thereon. Likewise, FIG. 8b graphically illustrates transient voltage impulses that can occur on the neutral line 38. The impulses of FIGS. 8a and 8b can appear simultaneously on both the power line 36 and the neutral line 38 in the same polarity, which is an extremely damaging type of common mode noise, oftentimes causing disruption in the operation of electrical equipment. FIG. 8c shows the ground referenced power voltage and transient spikes of FIGS. 8a and 8b as taken from the midpoint tap 72. As above, the tap 72 reduces by one half the voltage of power line 36 in conjunction with the capacitor divide action of capacitors 66 and 68. However, transient voltage surges and impulses appearing at the tap 72 appear as the same shape and amplitude as originated on the power line 36 or neutral line 38 because of the nature of the impulses high frequency components. Essentially, capacitors 66 and 68 behave as short circuits for the impulses to the midpoint tap 72.

As illustrated in FIG. 8c, the four possible turn-on combinations of the gates of the switches described herein of the operating voltage and impulse polarity are described using conventional quadrant terminology of Quadrant 1 (Q1), Quadrant 2 (Q2), Quadrant 3 (Q3), and Quadrant 4 (Q4). Quadrant 1 refers to the condition of positive operating voltage when positive impulses are present. Quadrant 2 refers to the condition of negative operating voltage and positive impulses. Quadrant 3 refers to the condition of negative operating voltages and negative impulses. Quadrant 4 refers to the condition of positive operating voltages with negative impulses thereon.

Figure 8D:
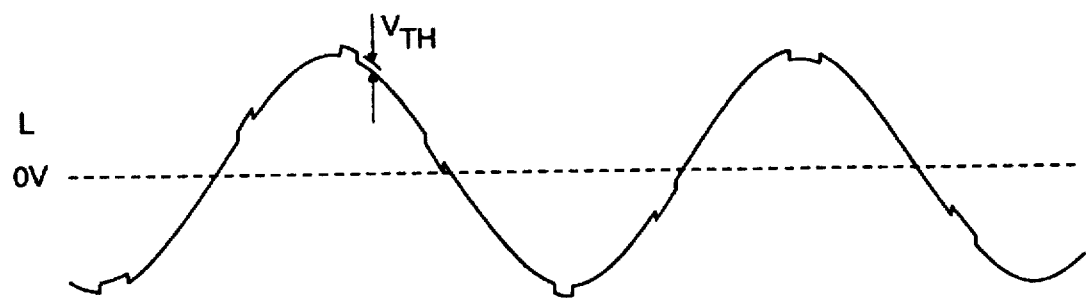
FIGS. 8d, 8e show the net spike reduction to EEF.
Figure 8E:

Referring to FIG. 7, the Miller Integrators are biased by the voltage developed on the capacitors 82 and 85 of each of the branch circuits 94 and 96 respectively. Simply, positive impulse conditions of Q1 and Q2 are attenuated by the conduction of branch 94 through capacitor 82. The intrinsic diode of the power MOSFET switch 124 will attenuate Q1 impulses that are present at the midpoint tap 72 that are greater than the peak positive operating voltage of the midpoint tap 72 to which the capacitor 85 of the branch circuit 96 is charged. Similarly, negative impulse conditions of Q3 and Q4 are attenuated by the conduction of branch 96 through capacitor 85. The intrinsic diode of the power MOSFET switch 118 attenuates Q3 impulses which are more negative than the peak negative operating voltage of the midpoint tap 72 to which the capacitor 82 of the branch circuit 94 is charged. Thus, the power conditioner 100 of the present invention is a full 4-quadrant device that advantageously overcomes polarity sensitivity and voltage range limitations of conventional filters using the combination of the Miller Integrator, the intrinsic diode characteristics of the other Miller Integrator and the capacitors 82 and 85. Power conditioner 100 behaves as a soft switch to impulses. FIGS. 8d, 8e are the net effect of the EEF of FIG. 7 on the impulses of FIGS. 8a and 8b.

Figure 9:
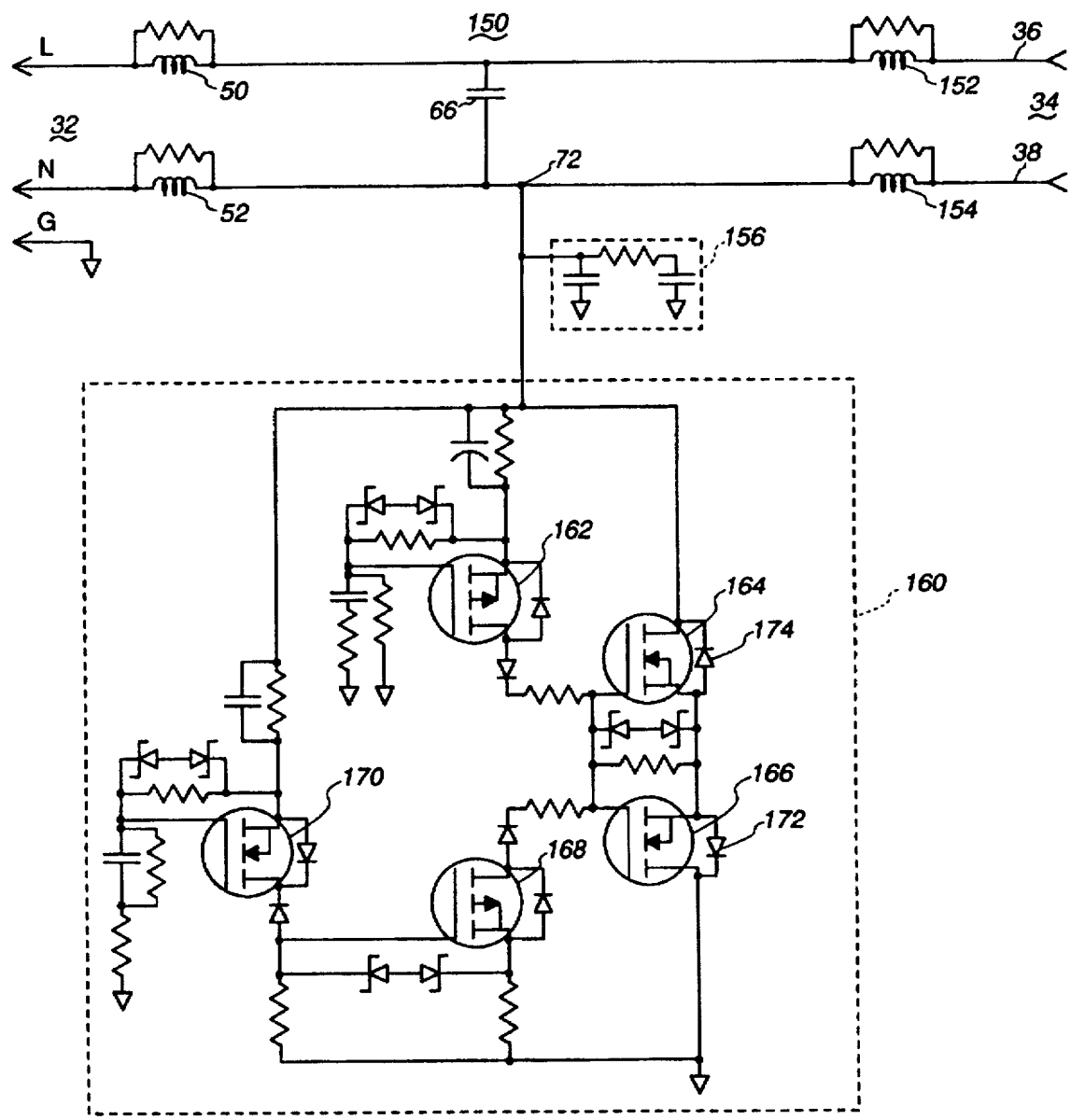
FIG. 9 is a circuit diagram illustrating a 2-quadrant, bi-polar, electrically enhanced filter according to another embodiment of the present invention.

Referring to FIG. 9, the power conditioner 150 provides another type of normal mode and common mode filter for operating on hi-polar impulses with zero or small values of operating voltage. The power conditioner 150 includes the line inductors 50 and 52, the load inductors 152 and 154, the capacitor 66, the frequency stabilization section 156, and the EEF 160. The line inductors 50 and 52 can be selected to be 400μHenrys, and the load inductances 152 and 154 selected at 200 μHy. Alternatively, the line inductors 50 and 52 can be replaced by the line impedances 102 and 104, and the line inductors 152 and 154 can be replaced by the line impedances 106 and 108, as shown in FIG. 7. The section 156 operates to stabilize and compensate the EEF 160. The section 156 can be constructed from a 0.005 μF capacitor connected in series to a 12 Ω resistor, which are connected in parallel to a 0.001 μF capacitor and then to the ground line 40.

The EEF 160 includes MOSFET switches 162, 168 and 170 and power MOSFETS 164 and 166. In operation, a positive impulse at tap 72 forward biases the gate-source junction of the p-channel MOSFET 162 which begins to conduct drain current. The output of MOSFET 162 is fed through the drain diode to forward bias the gates of the n-channel power MOSFET 164, operating in the forward direction, and n-channel power MOSFET 166, operating in the reverse drain-source direction. A MOSFET operating in the reverse drain-source direction conducts according to its intrinsic diode characteristics. If a forward bias is applied to the gate-source junction while drain-source is operating in reverse then the intrinsic diode will be shunted by the drain-source resistor. The configuration of MOSFETS 164 and 166 is also known as a bi-lateral switch. The impulse current is sinked to ground through the bi-lateral switch.

A negative impulse at tap 72 forward biases the gate-source of n-channel MOSFET 170 which conducts drain current to forward bias the gate-source of p-channel MOSFET inverter 168. The output of 168 is fed through the drain diode to forward bias the gates of the n-channel power MOSFET 166 operating in the forward direction and n-channel power MOSFET 164 operating in the reverse direction. The impulse current is sourced from the ground line through the bi-lateral switch. During a positive impulse the power MOSFET 164 acts as a transistor while the power MOSFET 166 acts as a diode 172, shunted by its drain-source resistor and during a negative impulse the power MOSFET 166 acts like a transistor while the power MOSFET 164 acts like a diode 174 shunted by its drain-source resistor.

The power Conditioner 150 meets the attenuation specification when tap 72 has an operating voltage nearly equal to zero volts, thereby operating only on positive and negative impulses in Q1 and Q3 from either the power or the neutral lines 36 and 38, respectively. The power conditioner 150 has an application for suppressing transient impulses on data and telephone lines as these are not miswired because, if these were, the electronic equipment would not operate. The power conditioner 150 eliminates capacitors 82 and 85, thereby simplifying the design, improving reliability, and reducing the cost of manufacture.

Ground Conditioning

Referring to FIGS. 10 through 15, the present invention can utilize ground conditioning to provide improved performance and increased protection from transients on any line of the three-wire power distribution system. Ground conditioning can be defined as the safe insertion of an impedance in the ground line 40 in the electrical circuit of the power distribution system without compromising electrical fault protection. This impedance breaks up ground loops and blocks ground surge currents from propagating from the power line 36 or the neutral line 38 into an electrical systems ground reference in the power distribution system. Typically, ground references are described as earth ground and safety ground. Earth ground (EG) is a ground reference line that returns to earth potential (absolute ground) with as little impedance as practical. Safety ground (SG) is a near earth potential, low impedance reference line that returns equipment ground fault currents to the over current protector.

Figure 12:
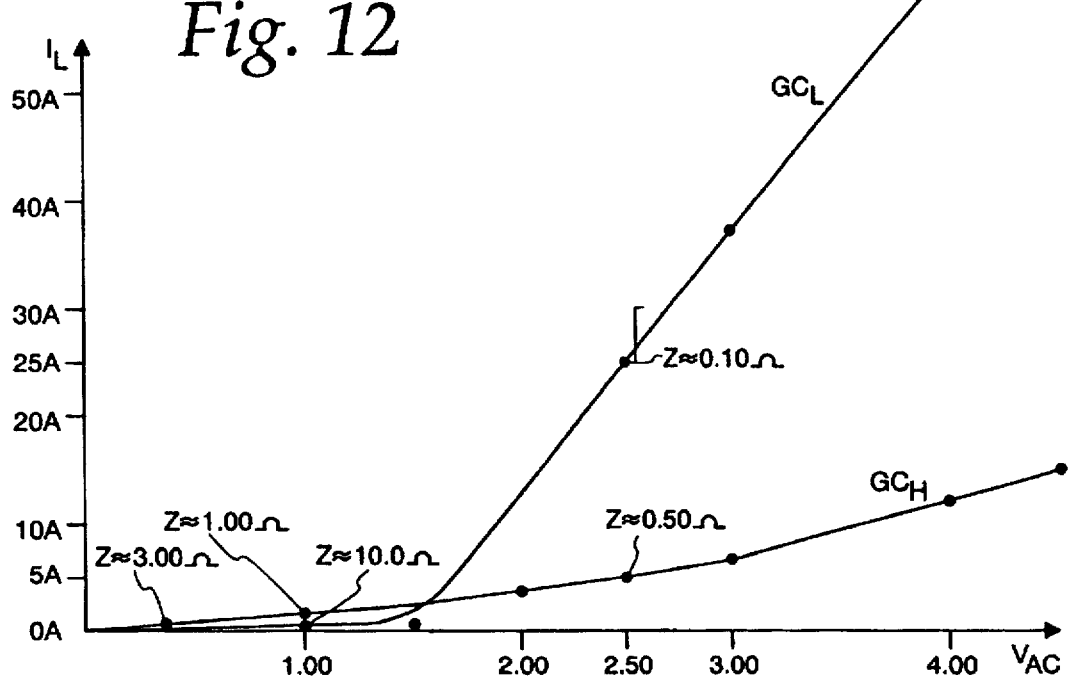
FIG. 12 is a graph illustrating low and high level ground conditioning plotting the current through the inductor against the voltage across the inductor.

A distinction is made between high and low level ground conditioning. Low level ground conditioning $GC_l$ operates within the impedance of 0.1 Ω or less for currents more than 25 A at 2.5 VAC, as shown in FIG. 12, whereas high level ground conditioning $GC_h$ is an impedance of a higher value at higher voltages also shown in FIG. 12. Low level ground conditioning $GC_l$ is advantageous for filtering current and voltage amplitudes that are within the above described 0.1 Ω impedance limitation.

Low Level Ground Conditioning ($GC_l$)

Figure 10:
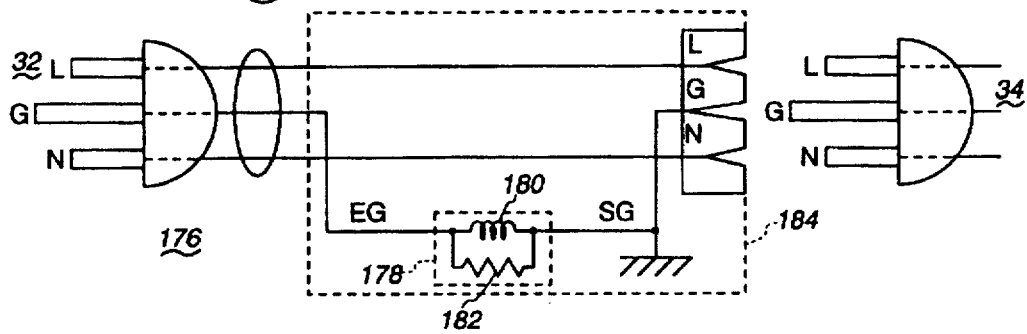
FIG. 10 is a circuit diagram illustrating low level ground conditioning.

Turning now to FIGS. 10 and 12, it will be seen that the ground conditioning circuit 176 includes an impedance 178 located in the ground line 40 between the line 32 and the load 34. The impedance 178 can be an inductor 180 connected in parallel with a resistor 182. The circuit 176 can be located within an enclosure 184. The impedance 178 has an inductive reactance of less than 0.1 ohms at 60 Hz for a voltage greater than 2.5 VAC. The impedance 178 is configured to block 60 Hz voltages in the range of 0 to 1.5 VAC. The resistor is rated at 1000 Ω. At 60 Hz, the impedance 178 has a very high impedance of 10 Ω up to about 1.5 VAC, the threshold of $GC_L$, and then decreases to 0.1 Ω at 2.5 VAC, as shown in FIG. 12. The $GC_L$ circuit 176 operates to choke high frequency transient currents. Low level ground conditioning $GC_L$ is frequency and amplitude dependent on the impulse transient current. As the frequency of the voltage on the ground line goes up, the threshold goes up proportionately. For example, at 600 Hz $GC_L$ will be 100 Ω up to 15.0 VAC at which time it begins to saturate and look like a lower impedance.

High Level Ground Conditioning ($GC_H$)

Figure 11:
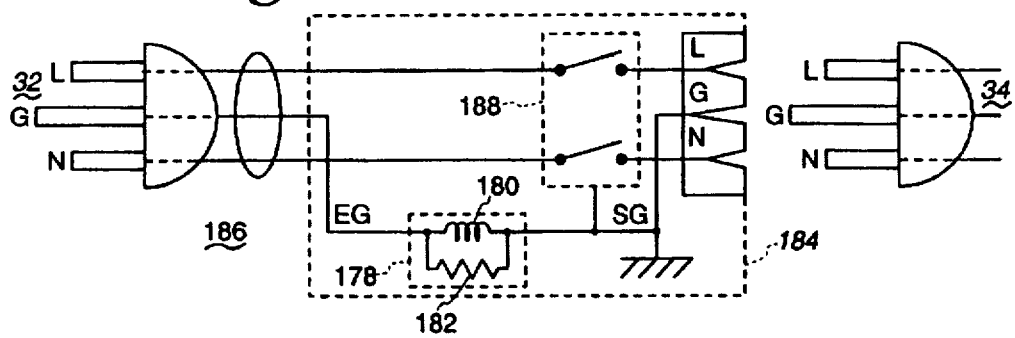
FIG. 11 is a circuit diagram illustrating high level ground conditioning.

Referring to FIG. 11, a high level ground conditioner 186 generally includes the impedance 178 and the appropriate ground fault circuit interrupter (GFCI) 188. The high level conditioner can be enclosed within the enclosure 184. High level ground conditioning ($GC_H$) is defined as an electrical impedance characterized by the power line 36 conditions under which it is applied. Specifically, high level ground conditioning $GC_H$ is determined by the nominal line voltage ($V_L$) divided by two times the over current ($I_{OC}$) rating of the branch line protection supplying the line voltage. The impedance (Z) of high level ground conditioning is set forth in the following formula, $$Z\ GC_h = V_L/2 \times I_{OC} \qquad (3)$$

For example, a single phase application of 120 volts AC, protected by a nominal 20 A circuit breaker, the impedance is 3 ohms. There is no voltage limit for the magnitude of the impedance of high level ground conditioning $GC_h$ except that the impedance be less than 3.0 ohms at 120 volts AC. The present invention provides a transformerless high level ground conditioner which takes advantages of increased reliability, simplicity, less bulk weight and cost.

Referring to FIG. 12, the voltage versus current characteristics of transformerless high level ground conditioning $GC_h$ illustrate that there is no sharp break point characteristic as in low level ground conditioning $GC_l$, and the curve has a smaller angle of increase, at or above 2.5 volts AC, indicating the higher impedance of high level ground conditioning $GC_h$ with respect to low level ground conditioning $GC_l$. The advantage of high level ground conditioning $GC_h$ over low level ground conditioning $GC_l$ is that high level ground conditioning $GC_h$ can provide more than 30 times (3 ohms/0.1 ohms) the ground conditioning capacity of low level ground conditioning $GC_l$ at 60 Hz voltages greater than 2.5 VAC. For both high and low level ground conditioning, and apart from the need to have certain characteristics at 60 Hz, these ground conditioners perform an electrical filtration function to block higher frequency noise and a surge current from conducting into a computer system ground. Wide band impedance capability is desired in its application, i.e. a bandwidth of 100 MHz has been set. Further, these ground conditioners need to block surge currents in the ground lines that are injected by surge diverters. In order to meet this requirement, high and low ground conditioning must block, without saturating, high energy noise frequency components in the 5 to 2000 KHz range.

The ground impedance for $GC_h$ and $GC_l$ have been described as an inductor usually in parallel with a resonant damping ("snubbing") resistor. The ground impedance could also be resistors, capacitors, diodes, transistors or combinations thereof as discussed in my patent applications Ser. No. 07/921,337 filed Jul. 29, 1992 and Ser. No. 08/404,532 filed Mar. 15, 1995, which are incorporated by reference as if fully set forth herein. These alternatives could be adapted to meet the characteristics shown in FIG. 12.

Power and Ground Conditioning

Figure 13:
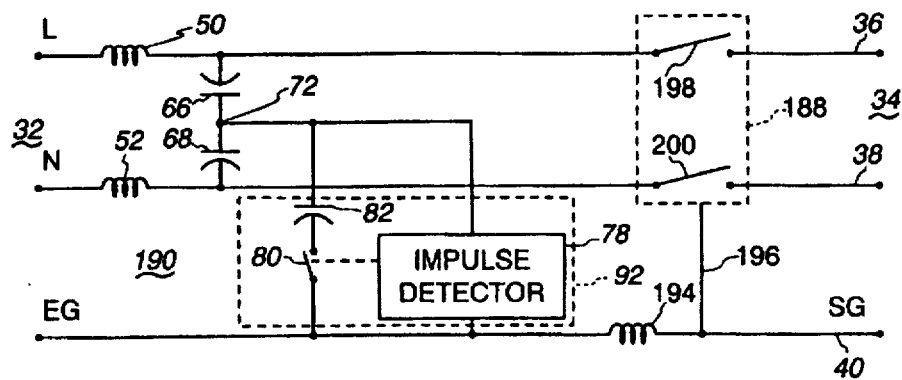
FIG. 13 is a circuit block diagram illustrating power and ground conditioning according to an embodiment of the present invention.
Figure 14:
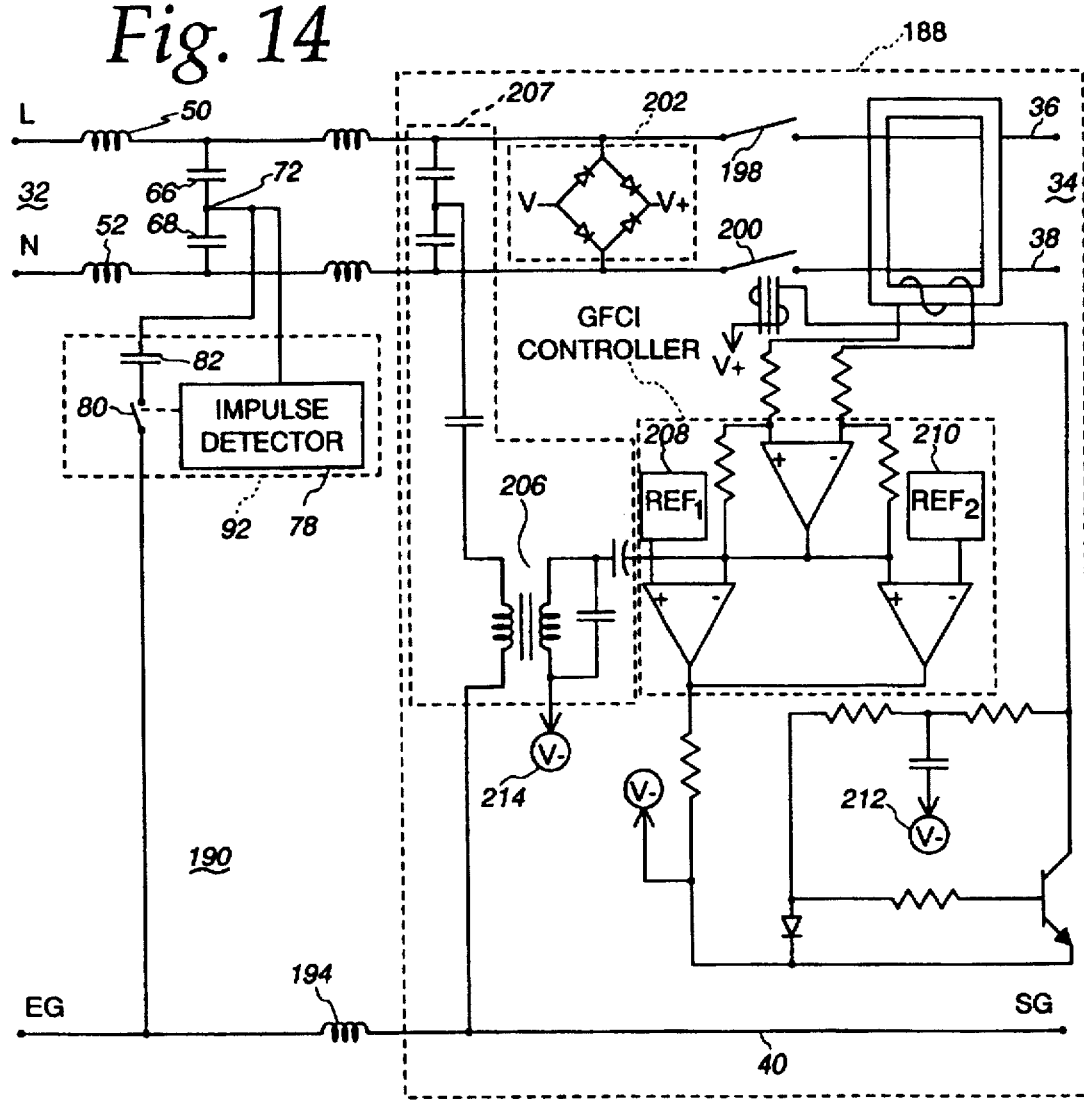
FIG. 14 is a circuit diagram detailing the GFCI of FIG. 13 illustrating power and ground conditioning, along with the block diagram of power and ground conditioning.

Referring to FIGS. 13 and 14, the present invention can provide power conditioning of the power and neutral lines using the electrically enhanced filter in combination with ground conditioning. As illustrated in FIG. 13, power and ground conditioning of the present invention can be implemented in a triggered filter 190 having the EEF 92, the appropriate GFCI 188 and an inductor 194. The GFCI 188 can be effectively attached to the ground line 40 through the EEF 92, but can be grounded by a separate line 196. The GFCI 188 is conventionally configured to provide detection of fault conditions by monitoring the difference between currents in the power line 36 and neutral line 38; input open neutral protection, in the case of miswiring; and output neutral to ground short circuit protection, in the case of circuit shorts in the wiring. If a ground fault condition occurs by the difference exceeding a predetermined threshold current, the GFCI 188 opens up a pair of contact switches 198 and 200, one in each conductor, to open the power line 36 and neutral line 38, for example, upon detection of a difference exceeding 6 milliAmps (6 mA). The contact switches 198 and 200 of the GFCI 188 are normally open (NO) and close when power is applied in the absence of a fault condition. The inductor 194 connected to the ground line can be replaced by the impedance 178 inserted into ground line 40 between the line 32 and the separate line 196 connected to the GFCI 188, thereby providing high level ground conditioning as is discussed herein. In operation, when a transient voltage impulse occurs on the power line 36 exceeding the turn-on threshold of the EEF 92, the impulse detector 78 is triggered to close the switch so as to attenuate the impulse, thereby conducting the impulse current to ground line 40 as described above. The EEF 92 can use the soft switch configuration of FIGS. 7 or 9 so as not to generate other impulses on the power line that may be in excess of the incident voltage impulse. After the EEF 92 has attenuated the impulse, it turns off and remains in a ready state to attenuate the next impulse. Between impulses, the triggered falter 190 is in the off state and only conducts current to its impulse detection circuit, for example, a current of less than 500 μA.

Referring to FIG. 14, the GFCI 188 can be implemented with conventional GFCI components available in the marketplace and configured to interrupt power to the load 34 on detection of a line 32 open neutral, load 34 neutral to ground short circuit or load 34 ground fault condition. GFCI's have been conventionally configured to detect load neutral-ground short circuits by using either a "dormant" oscillator circuit or a 120 Hz Transmitter/Receiver circuit. The "dormant" oscillator, used in most GFCIs is an electronic oscillator on the verge of regenerative feedback oscillation, for example, the electronic oscillator's frequency of regenerative oscillation is in the region of 3 to 8 KiloHertz. Regenerative feedback oscillation occurs when a load 34 neutral-ground short circuit condition exists. The GFCI 188 can be implemented with an IC controller such as manufactured by RAYTHEON having part number RV4141, whereby the dormant oscillator circuit is described in further detail in the, 1994 Data Book, page 3–829. Additionally, other GFCI's use a 120 Hz Transmitter/Receiver oscillator circuit, described in greater detail for the RAYTHEON part number LM1851 in the 1994 Data Book, page 3–843. However, the present invention uses a "dormant" oscillator and may tap reference voltages from the EEF 92 as indicated by references V+, V−, as discussed herein.

Conventional GFCIs with dormant oscillators require a low impedance at the oscillator's frequency along the line side 32 neutral and ground lines as well as a short circuit between the line side 32 neutral and ground lines. Inductors 52, 154 or 194, or their substitute impedances 104, 108 and 178, respectively, may impose impedances on their respective lines at the oscillator's frequency that may disrupt the operation of conventional GFCIs for correct detection of load 34 neutral to ground short circuits and thereby render the GFCI as a hazard. GFCI 188 overcomes this problem with a series resonant circuit that bypasses these line components on their load side 34 at the "dormant" oscillator's resonant frequency.

In operation, when power is applied to the line 32, the circuit of the GFCI 188 applies power to the load 34 along the power line 36 and neutral line 38 through closed contacts 198 and 200, respectively, when no fault condition exists. Either 92 or the full wave bridge 202 supplies power, V+, V−, to power up the controller and the solenoid that actuates contacts 198 and 200. If either the line 32, power line 36 or neutral line 38 are open, the contact switches 198 and 200 remain open because power is unavailable to close the GFCI contacts. The GFCI 188 circuit uses a differential amplifier circuit 204 of the GFCI controller for driving both the load sides, power and neutral lines 36 and 38 with a separate small transformer 206, thereby detecting the load 34 neutral-ground impedance with the transformer 206 series resonating with the coupling capacitors between neutral and ground at the "dormant" oscillator's frequency. The components forming the series resonance detection of load neutral-ground short circuits are 207. The rest of the circuitry in 188 are the components that would comprise a conventional GFCI.

The amplifier circuit 204 as part of the controller includes signal references 208 and 210 which may also be supplied to the EEF 92 for use by the impulse detector 78 to open or close switch 80. A positive voltage 212 and a negative voltage 214 are derived from 202 or 92.

Uninterruptible Power Supplies (UPS) and EEF with Ground Conditioning

Figure 15:
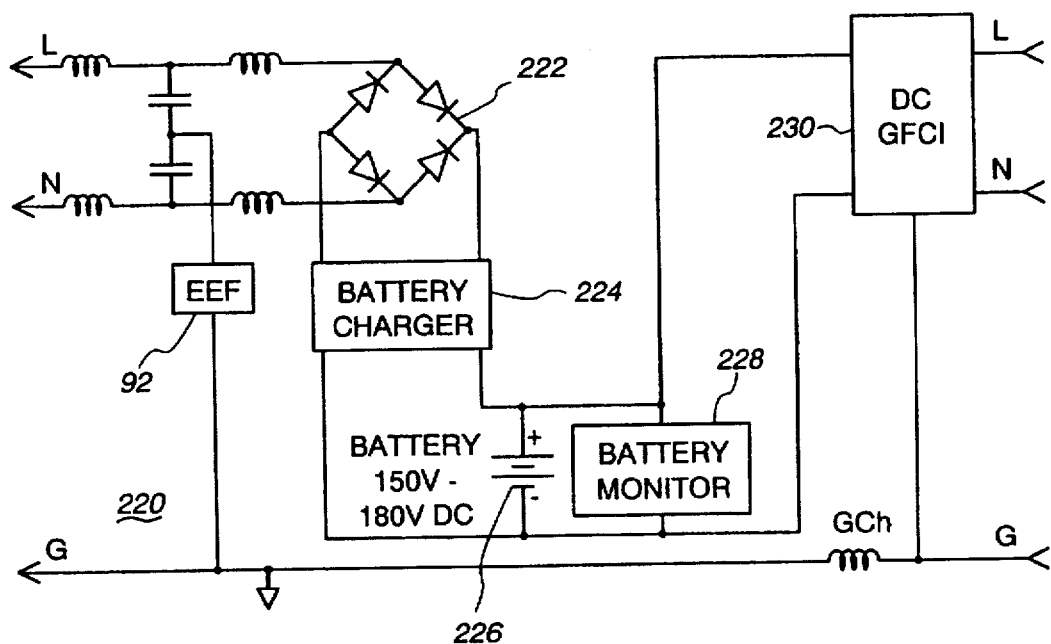
FIG. 15 is a block diagram illustrating a DC-UPS system having power and ground conditioning.

Referring to FIG. 15, a Direct Current Uninterruptible Power Supply (DC-UPS) is illustrated utilizing the enhanced electronic filter (EEF) 92, of the present invention and/or ground conditioning. Most personal computers use a switch mode power supply which is energized by either an AC power distribution system or a DC power supply or a DC battery back up system also known as a DC uninterruptible power supply (DC-UPS). However, problems exist with conventional DC-UPS systems as these are not a good filter for power line transients with respect to ground, common mode noise, and ground loop currents. The DC-UPS of the present invention can be used advantageously to solve all power line related electrical disturbances that may effect electronic system misbehavior: (1) power outages or brown-outs; (2) common mode noise; (3) normal mode noise; and (4) ground conduction problems as referred to under $CG_L$ and $GC_H$.

The EEF 92 or other EEFs as described herein, can be utilized in a DC-UPS with or without ground conditioning. As above the EEF 92 attenuates power line transient or voltage impulses at the input or line side of the power distribution system 32. A full wave bridge 222 converts bi-polarity AC input voltage to a DC voltage having its output supplied to a battery charger 224 to charge the battery 226. A battery monitor 228 may be used to indicate the level of charge of the battery 226, to diagnose and regulate the charge status, and improve reliability of the battery 226. The battery should have voltage for most personal computer configurations that operate from the power line without a transformer as these typically require 150 to 180 VDC. The DC voltage of the battery 226 is applied to the power line 36 and neutral line 38 terminals of the load 34 power connection through a GFCI 230. Various GFCI's are available that operate to monitor DC currents instead of the AC currents as previously described. The DC GFCI 230 can have a detection circuitry similar to that used in 188 to protect against the load side neutral-ground short circuit fault condition. The detection circuitry can be configured as used for 188 to detect and then by-pass the impedances of the power, neutral and ground lines 36, 38, and 40, respectively. The use of transformerless power line filtering (electronic enhanced filters (EEF)) and ground conditioning in the DC-UPS has additional advantages not disclosed in the art. The DC-UPS battery back up system can advantageously provide continuous power to an electronic system in the event of a power outage or brownout and having: (1) the EEF 92 conditioning of transients and voltage impulses on the power line; and (2) the ground conditioner, either high or low level ground conditioning, protecting against ground loop problems. In this manner, all the power and ground conditioning needs of an electronic device are satisfied. Further, a DC-UPS battery back up system can be manufactured advantageously having simpler circuitry, packaging and at a lower cost than conventional AC battery back up systems.

While FIG. 15 shows a battery of 150 V–180 VAC used for the DC energy reservoir, alternate forms of energy reservoirs can be used such as: (1) capacitors; (2) inductors—particularly superconducting inductors; and (3) rotational energy machines that store energy in rotary motion and convert it to DC as required by the load. The functions of the battery charger and monitor will be modified as required by the alternate energy form.

It will be evident that the system according to the invention, using common elements to perform the functions according to the present invention or custom designed elements which perform those functions, provides a versatile system for suppressing transient currents on a ground line without the use of a transformer. Various changes can be made to the invention without departing from the spirit thereof or scope of the following claims.

Unique AC-UPS Utilizing the Switch Function of the GFCI

UPSes can be classified into two types: on-line and off-line. The conventional on-line UPS is continually converting AC to DC to charge up its DC energy reservoir and converting it back again to AC with its inverter a low voltage drive the load. When the main power goes to a low voltage (brown out) or outage condition, the on-line LIPS is automatically providing power to the load from its DC energy reservoir. However, the DC-UPS described herein is a unique on-line UPS that does not need an inverter.

Figure 16:
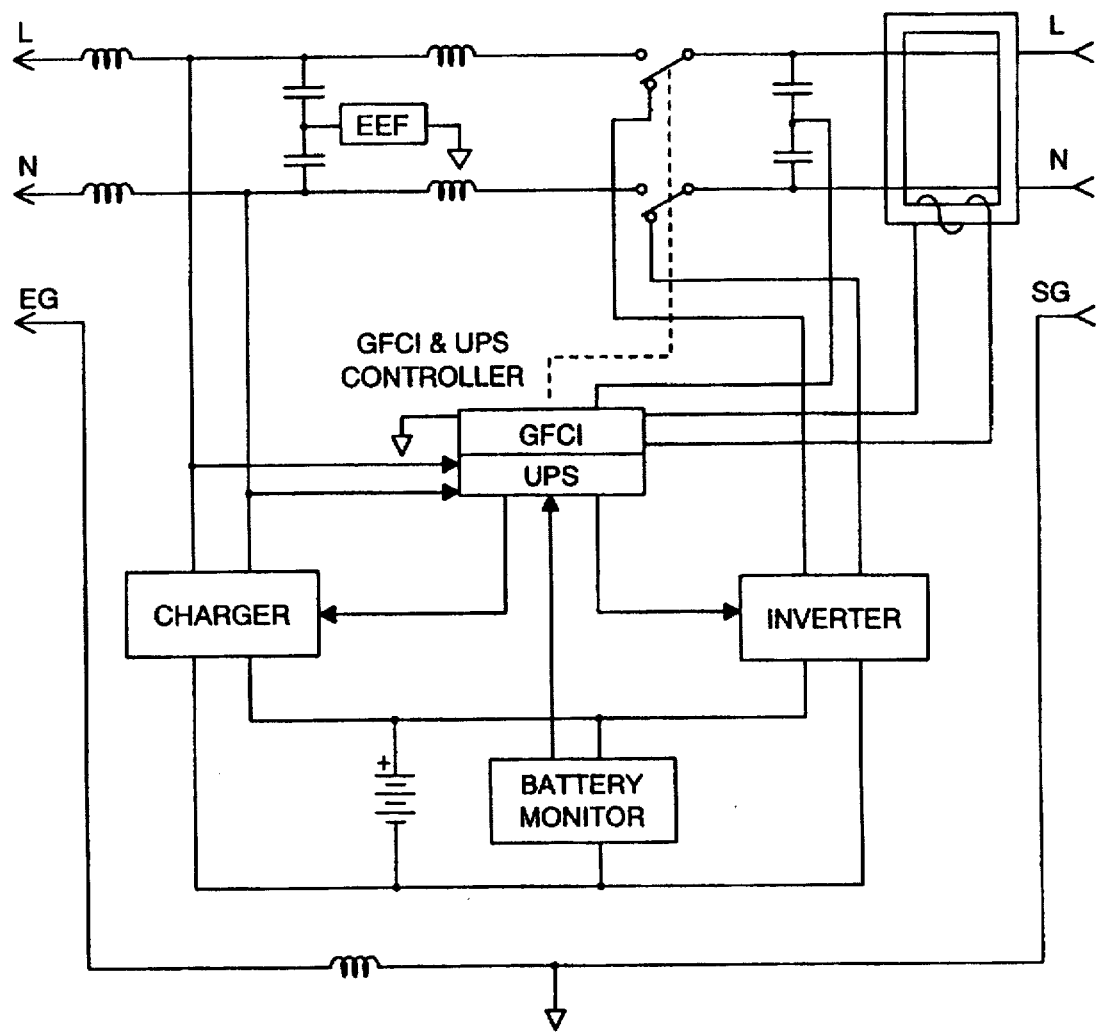
FIG. 16 is a block diagram illustrating an AC-UPS system having power and ground conditioning.

In contrast to the on-line UPS, in the event of a detected low voltage or outage condition of the main power, the off-line UPS uses either a power relay or a semiconductor to switch its load from the main power connection to the energy reservoir. The off-line UPS couples its energy reservoir to its load through an inverter comparable to that used in the on-line UPS. The off-line UPS is also continually charging up its energy reservoir, but it does not need to keep its inverter section running at power as does the on-line UPS. The off-line UPS' inverter is only in operation when reserve power is required. Of the two types of AC-UPS—on-line and off-line—the off line tends to be the least expensive and more reliable There are applications where an off-line AC-UPS will be preferred over the DC-UPS and common mode noise filtering and high level ground conditioning are still desired. As mentioned, a requirement of off-line UPSes is that the energy reservoir needs to be switched into the power providing path for the load when the main power source has detected low voltage or voltage outage. Typically, a conventional off-line AC-UPS uses either a power relay or a semiconductor circuit to provide this switch function. While it is easy enough to add a GFCI with the appropriate ground impedance to the off-line UPS, note that the GFCI function and off-line AC-UPS function each provides a set of power switches to the power line. A more cost effective way of providing the AC-UPS function as well as the GFCI function is to combine the power switching sections of both as well as the control logic. FIG. 16 is a block diagram of this concept.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. An electrically enhanced filter for suppressing transient impulses in a power distribution system having a power line and a neutral line referenced to ground, the filter comprising:

a normal mode filter having an inductor located on the power line and an inductor located on the neutral line between a line and a load of the power distribution system, and a pair of capacitors arranged in series and connected between the power and neutral lines, whereby a midpoint tap is formed between said pair of capacitors;

a common mode filter being formed by said inductor on the power line, said inductor on the neutral line, and an impulse capacitor connected at one end to said midpoint tap and at the other end to ground; and an electronic trigger comprised of an impulse detector and a switch, said electronic trigger being located between said impulse capacitor and ground, whereby said switch being normally open and being configured to close upon detection of the transient impulse at said midpoint tap so as to attenuate said transient impulse and conduct it to ground.

2. The filter of claim 1 wherein said pair of capacitors are of equal capacitive reactance.

3. The filter of claim 2 wherein the impulse capacitor has a capacitance of 0.02 microfarads.

4. The filter of claim 3 wherein said switch impulse capacitor has a capacitance value of >>0.02 µF.

5. The filter of claim 1 wherein said electronic trigger closes said switch when the transient impulse above a predetermined threshold voltage is sensed by said impulse detector at said midpoint tap.

6. The filter of claim 5 wherein said switch is configured as a reverse operated Miller Integrator, said reverse operated Miller Integrator operates as a voltage differentiator.

7. The filter of claim 6 wherein said reverse operated Miller Integrator is configured using said switch formed of at least one power MOSFET.

8. The filter of claim 7 wherein the electrically enhanced filter operates as a comparator, said comparator comparing a voltage at said midpoint tap to a reference voltage thereby generating an error signal, said error signal being amplified, by an amplifier, said amplifier operatively supplies a negative feedback correctional signal to said midpoint tap so as to attenuate transient impulses to reduce the error signal.

9. The filter of claim 8 further including a Ground Fault Circuit Interrupter (GFCI) located between a line and a load of the power distribution system, said GFCI having a connection to ground.

10. The filter of claim 9 further including an impedance located on a ground line between said line and said load, whereby said impedance provides high level ground conditioning of said ground line.

11. A method of power conditioning so as to attenuate transient impulses propagating in a power distribution system having a power line and a neutral line, the method comprising the steps of:

causing a voltage to be monitored simultaneously on both the power and neutral lines of the power distribution system at a midpoint tap of a common mode filter;

detecting a transient impulse at said midpoint tap;

comparing said voltage at said midpoint tap to a reference voltage of the power distribution system;

generating an error signal representing the difference between said voltage at said midpoint tap and said reference voltage;

amplifying said error signal;

inverting said error signal; and supplying said error signal to said midpoint tap to reduce the error signal.

12. A Direct Current Uninterrupted Power Supply (DCUPS) for suppressing transient impulses in a power distribution system having a power line and a neutral line referenced to a ground line, the DCUPS comprising:

a normal mode filter having at least one combination of inductor located on the power line and at least one inductor located on the neutral line between a line and a load of the power distribution system, and a pair of capacitors arranged in series and connected between the power and neutral lines, whereby a midpoint tap is formed between said pair of capacitors;

a common mode filter being formed by said inductor on the power line, said inductor on the neutral line, and an impulse capacitor connected at one end to said midpoint tap and at the other end to ground;

an electronically enhanced filter comprised of an electronic trigger that includes and impulse detector and a switch, said electronic trigger being located between said impulse capacitor and ground, whereby said switch being normally open and being configured to close upon detection of the transient impulse at said midpoint tap so as to attenuate said transient impulse and conduct it to ground;

a DC energy storage device;

a Direct Current Ground Fault Current Interrupter (DC-GFCI) referenced to the ground; and a charger for charging said storage device.

13. The DC/UPS system of claim 12 further including a monitor adapted to monitor the charge of the DC energy storage device.

14. A device for suppressing transient currents on a ground line of a power distribution system, the power distribution system having a power line and a neutral line, the device comprising:

inductor means for attenuating a surge current propagating on the ground line, said inductor means located between an input terminal and an output terminal of the ground line, said surge current being supplied to the ground line through a coupling between the power distribution system and the ground line, said inductor means having a primary winding on a saturable core of a predetermined inductance value; and a resistor connected in parallel with said inductor means between said input and said output terminals of the ground line;

whereby said inductor means and said resistor isolate the ground line from the power line between said input and said output terminals of the ground line thereby forming a ground impedance for suppressing transient currents on the ground line.

15. The device of claim 14 whereby said predetermined inductance value is approximately 0.10 ohms when said inductor means is operating at a cycle of about 60 Hz and operating at a voltage of 2.5 VAC.

16. The device of claim 14 wherein said coupling of said surge current to the ground line is an injection coupling whereby an electronic device is coupled between the neutral line and the ground line and said device supplies said surge current.

17. The device of claim 14 wherein said coupling of said surge current to the ground line is an injection coupling whereby an electronic device is coupled between the neutral line and the power line and said device supplies said surge current.

18. The device of claim 14 wherein said coupling of said surge current to the ground line is transmission coupling where the power line of the power distribution system transmits electromagnetic radiation which in turn induces said surge current in the ground line.

19. The device of claim 14 wherein said coupling of said surge current to the ground line is transmission coupling where the neutral line of the power distribution system transmits electromagnetic radiation which in turn induces said surge current in the ground line.

20. The device of claim 14 wherein said coupling of said surge current to the ground line is an inductive coupling between a continuous, closed primary current loop, and the ground line of the power distribution system forms a continuous, closed secondary loop, said inductive coupling supplies said surge current to the ground line by current induction from changing magnetic fields of said primary current loop to said second current loop.

21. The device of claim 14 wherein said coupling is an inductive coupling where the neutral line of the power distribution system forms a continuous, closed primary current loop, and the ground line of the power distribution system forms a continuous, closed secondary loop, said inductive coupling supplies said surge current to the ground line by current induction from changing magnetic fields of said primary current loop to said second current loop.

22. The filter of claim 14 further including a Ground Fault Circuit Interrupter (GFCI) located between a line and a load of the power distribution system, said GFCI having a connection to ground.

23. An Alternating current Uninterrupted Power Supply (ACUPS) for suppressing transient impulses in a power distribution system having a power line and a neutral line referenced to a ground line, the ACUPS comprising:

- a normal mode filter having at least one combination of inductor located on the power line and at least one inductor located on the neutral line between aline and a load of the power distribution system, and a pair of capacitors arranged in series and connected between the power and neutral lines, whereby a midpoint tap is formed between said pair of capacitors;

- a common mode filter being formed by said inductor on the power line, said inductor on the neutral line, and an impulse capacitor connected at one end to said midpoint tap and at the other end to ground;

- an electronically enhanced filter (EEF) comprised of an electronic trigger that includes and impulse detector and a switch, said electronic trigger being located between said impulse capacitor and ground, whereby said switch being normally open and being configured to close upon detection of the transient impulse at said midpoint tap so as to attenuate said transient impulse and conduct it to ground;

- a DC energy storage device;

- an Alternating Current Ground Fault Current Interrupter (AC-GFCI) referenced to the ground having control elements; and

- a charger for charging said storage device;

- wherein said switch is shared in common between said AC-UPS and said AC-GFCI.

* * * * *